(12) United States Patent
Shinozaki et al.

(10) Patent No.: US 10,442,318 B2
(45) Date of Patent: Oct. 15, 2019

(54) VEHICLE SEAT

(71) Applicant: TOYOTA BOSHOKU KABUSHIKI KAISHA, Aichi-ken (JP)

(72) Inventors: Yushi Shinozaki, Aichi-ken (JP); Masahide Kimura, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 76 days.

(21) Appl. No.: 15/603,759

(22) Filed: May 24, 2017

(65) Prior Publication Data

US 2017/0341530 A1    Nov. 30, 2017

(30) Foreign Application Priority Data

May 26, 2016 (JP) ................... 2016-105310

(51) Int. Cl.
*B60N 2/04*    (2006.01)
*B60N 2/06*    (2006.01)
(Continued)

(52) U.S. Cl.
CPC ............. *B60N 2/045* (2013.01); *B60N 2/06* (2013.01); *B60N 2/1615* (2013.01);
(Continued)

(58) Field of Classification Search
CPC ........ B60N 2/045; B60N 2/06; B60N 2/0745; B60N 2/10; B60N 2/1615; B60N 2/165;
(Continued)

(56) References Cited

U.S. PATENT DOCUMENTS 5,022,707 A * 6/1991 Beauvais ............. B60N 2/4214
248/371
5,449,218 A * 9/1995 Beauvais ............. B60N 2/4214
297/216.19
(Continued)

FOREIGN PATENT DOCUMENTS

| DE | 102 42 968 | 3/2004 |
|---|---|---|
| DE | 20 2005 009 185 | 10/2006 |
| EP | 2 279 899 | 2/2011 |
| EP | 2 415 630 | 2/2012 |
| JP | 2012-35641 | 2/2012 |

OTHER PUBLICATIONS

Office Action issued in Germany Counterpart Patent Appl. No. 102017208812.5, dated May 10, 2019, along with an English translation thereof.

*Primary Examiner* — James M Ference
(74) *Attorney, Agent, or Firm* — Greenblum & Bernstein, P.L.C.

(57) ABSTRACT

A vehicle seat includes: a seat frame that serves as at least a portion of a skeletal structure; a fixed bracket that is fixed on the indoor wall, the fixed bracket including a connection part having a connection surface that is substantially orthogonal to a seat width direction and extending in a substantially vertical direction; a link member in which one end is swingably connected with the connection part and the other end is connected with the seat frame, the link member being swingable in a direction substantially parallel with the seat width direction set as a swinging center axis; and a regulation part which extends from the connection part in a direction substantially parallel with the swinging center axis, the regulation part being configured to regulate, by abutting on the link member in the seat front-and-rear direction, that the link member swings beyond a preset swinging range.

4 Claims, 4 Drawing Sheets

(51) Int. Cl.
  *B60N 2/16* (2006.01)
  *B60N 2/68* (2006.01)
  *B60N 2/42* (2006.01)
  *B60N 2/427* (2006.01)

(52) U.S. Cl.
  CPC ....... *B60N 2/4214* (2013.01); *B60N 2/42736* (2013.01); *B60N 2/68* (2013.01)

(58) Field of Classification Search
  CPC ...... B60N 2/167; B60N 2/169; B60N 2/1695; B60N 2/1814; B60N 2/1825; B60N 2/1828; B60N 2/1832; B60N 2/68
  See application file for complete search history.

(56) References Cited

U.S. PATENT DOCUMENTS

| | | | | |
|---|---|---|---|---|
| 5,730,492 A * | 3/1998 | Warrick | B60N 2/4221 | 297/216.2 |
| 5,782,533 A * | 7/1998 | Fischer | B60N 2/06 | 248/421 |
| 5,882,061 A * | 3/1999 | Guillouet | B60N 2/1615 | 248/421 |
| 5,979,985 A * | 11/1999 | Bauer | B60N 2/1615 | 297/322 |
| 6,036,266 A * | 3/2000 | Massara | B60N 2/10 | 297/328 |
| 6,464,193 B1 * | 10/2002 | Nemoto | B60N 2/1615 | 248/396 |
| 6,533,351 B2 * | 3/2003 | Deptolla | B60N 2/4221 | 297/216.1 |
| 6,557,940 B2 * | 5/2003 | Hayashi | A61G 5/14 | 297/330 |
| 6,637,818 B2 * | 10/2003 | Williams | A61G 5/14 | 297/330 |
| 6,851,753 B2 * | 2/2005 | Akaike | B60N 2/1615 | 248/421 |
| 6,902,234 B2 * | 6/2005 | Becker | B60N 2/0715 | 248/421 |
| 6,921,058 B2 * | 7/2005 | Becker | B60N 3/16 | 248/370 |
| 6,966,598 B2 * | 11/2005 | Schmale | B60N 2/045 | 296/65.05 |
| 7,240,965 B2 * | 7/2007 | Messerschmidt | B60N 2/06 | 297/344.15 |
| 7,413,232 B1 * | 8/2008 | Fukui | B60N 2/245 | 296/65.09 |
| 7,413,252 B2 * | 8/2008 | Kim | B60N 2/165 | 297/344.15 |
| 7,766,427 B2 * | 8/2010 | Kojima | B60N 2/06 | 248/423 |
| 7,770,863 B2 * | 8/2010 | Yamada | B60N 2/165 | 248/419 |
| 7,861,994 B2 * | 1/2011 | Yamada | B60N 2/1615 | 248/421 |
| 7,918,501 B1 * | 4/2011 | Hanson | B60N 2/4221 | 297/216.2 |
| 7,984,950 B2 * | 7/2011 | Hoshi | B60N 2/1615 | 297/344.1 |
| 8,029,062 B2 * | 10/2011 | Appelqvist | B60N 2/10 | 297/325 |
| 8,047,596 B2 * | 11/2011 | Jungert | B60N 2/0232 | 296/65.05 |
| 8,172,326 B2 * | 5/2012 | Adragna | B60N 2/1615 | 297/344.15 |
| 8,215,710 B2 * | 7/2012 | Erker | A47C 1/03255 | 297/300.2 |
| 8,276,868 B2 * | 10/2012 | Chang | A47C 7/029 | 248/419 |
| 8,616,645 B2 * | 12/2013 | Ito | B60N 2/1615 | 297/344.15 |
| 9,855,870 B2 * | 1/2018 | Suzuki | B60N 2/165 | |
| 2001/0035673 A1 * | 11/2001 | Lepaule | B60N 2/1615 | 297/338 |
| 2003/0173487 A1 * | 9/2003 | Koga | B60N 2/067 | 248/421 |
| 2003/0222192 A1 * | 12/2003 | Ikegaya | B60N 2/1615 | 248/421 |
| 2004/0066077 A1 * | 4/2004 | Petry | B60N 2/1615 | 297/367 R |
| 2004/0075322 A1 * | 4/2004 | Jaeger | B60N 2/0224 | 297/325 |
| 2006/0061176 A1 * | 3/2006 | Sakai | B60N 2/1615 | 297/344.15 |
| 2007/0063565 A1 * | 3/2007 | Habedank | B60N 2/06 | 297/341 |
| 2007/0194613 A1 * | 8/2007 | Kojima | B60N 2/0705 | 297/344.15 |
| 2007/0210635 A1 * | 9/2007 | Wulf | B60N 2/0232 | 297/316 |
| 2008/0007104 A1 * | 1/2008 | Yokota | B60N 2/1615 | 297/344.15 |
| 2008/0048477 A1 * | 2/2008 | Ujimoto | B60N 2/045 | 297/344.1 |
| 2008/0224519 A1 * | 9/2008 | Ventura | B60N 2/06 | 297/313 |
| 2008/0309136 A1 * | 12/2008 | Kojima | B60N 2/12 | 297/340 |
| 2009/0242700 A1 * | 10/2009 | Raymond | B60N 2/1695 | 244/118.6 |
| 2009/0309383 A1 * | 12/2009 | Teufel | B60N 2/045 | 296/65.13 |
| 2010/0001569 A1 * | 1/2010 | Shinozaki | B60N 2/1615 | 297/344.15 |
| 2010/0127544 A1 * | 5/2010 | Panchbhaya | A61G 5/02 | 297/325 |
| 2010/0148532 A1 * | 6/2010 | Jungert | B60N 2/0232 | 296/65.18 |
| 2010/0253110 A1 * | 10/2010 | Yamada | B60N 2/161 | 296/65.08 |
| 2011/0227378 A1 * | 9/2011 | Swierczewski | B60N 2/06 | 297/216.15 |
| 2011/0272988 A1 * | 11/2011 | Schuler | B60N 2/1615 | 297/354.12 |
| 2012/0007401 A1 * | 1/2012 | Hashimoto | B60N 2/0232 | 297/344.13 |
| 2012/0032057 A1 | 2/2012 | Ito et al. | | |
| 2012/0043797 A1 * | 2/2012 | Fischbein | B60N 2/06 | 297/340 |
| 2012/0074743 A1 * | 3/2012 | Asakura | B60N 2/1615 | 297/216.1 |
| 2012/0212014 A1 * | 8/2012 | Arata | B60N 2/1615 | 297/216.1 |
| 2012/0212015 A1 * | 8/2012 | Ozawa | B60N 2/1615 | 297/216.1 |
| 2013/0200675 A1 * | 8/2013 | Beneker | B60N 2/0228 | 297/325 |
| 2013/0200677 A1 * | 8/2013 | Hoshi | B60N 2/1615 | 297/344.15 |
| 2013/0300164 A1 * | 11/2013 | Jonsson | B60N 2/42727 | 297/216.1 |
| 2013/0307301 A1 * | 11/2013 | Munemura | B60N 2/4228 | 297/216.13 |
| 2014/0306479 A1 * | 10/2014 | Abe | B60N 2/3013 | 296/65.09 |
| 2015/0130240 A1 * | 5/2015 | Hozumi | B60N 2/0244 | 297/340 |
| 2015/0203011 A1 * | 7/2015 | Fujita | B60N 2/68 | 297/284.11 |
| 2015/0336477 A1 * | 11/2015 | Matsui | B60N 2/682 | 297/344.15 |

\* cited by examiner

VEHICLE SEAT

CROSS-REFERENCE TO RELATED APPLICATION

This application claims priorities from Japanese Patent Application No. 2016-105310 filed on May 26, 2016, the entire subject matters of which is incorporated herein by reference.

TECHNICAL FIELD

The present disclosure relates to a structure of a vehicle seat.

BACKGROUND

A frame of a vehicle seat (hereinafter, referred to as a seat frame) is, for example, connected in an indoor wall floor through a link member as disclosed in JP-A-2012-035641.

When a large load acts on a seat frame, a link member is largely displaced together with the seat frame. For this reason, there is a risk that the large load excessively acts on another member which is displaced in mechanical conjunction with the link member.

SUMMARY

The present disclosure is made in consideration of the above-mentioned circumstances, and one of objects of the present disclosure is to provide a vehicle seat which can suppress that the large load excessively acts on the another member displaced in mechanical conjunction with the link member although the large load acts on the seat frame.

According to an illustrative embodiment of the present disclosure, there is provided a vehicle seat that is to be fixed in an indoor wall of a vehicle, the vehicle seat including: a seat frame that serves as at least a portion of a skeletal structure of the seat; a fixed bracket that is fixed on the indoor wall, the fixed bracket including a connection part having a connection surface that is substantially orthogonal to a seat width direction and extending in a substantially vertical direction; a link member in which one end is swingably connected with the connection part and the other end is connected with the seat frame, the link member being swingable in a direction substantially parallel with the seat width direction set as a swinging center axis; and a regulation part which extends from the connection part in a direction substantially parallel with the swinging center axis, the regulation part being configured to regulate, by abutting on the link member in the seat front-and-rear direction, that the link member swings beyond a preset swinging range.

DETAILED DESCRIPTION

Figure 1:
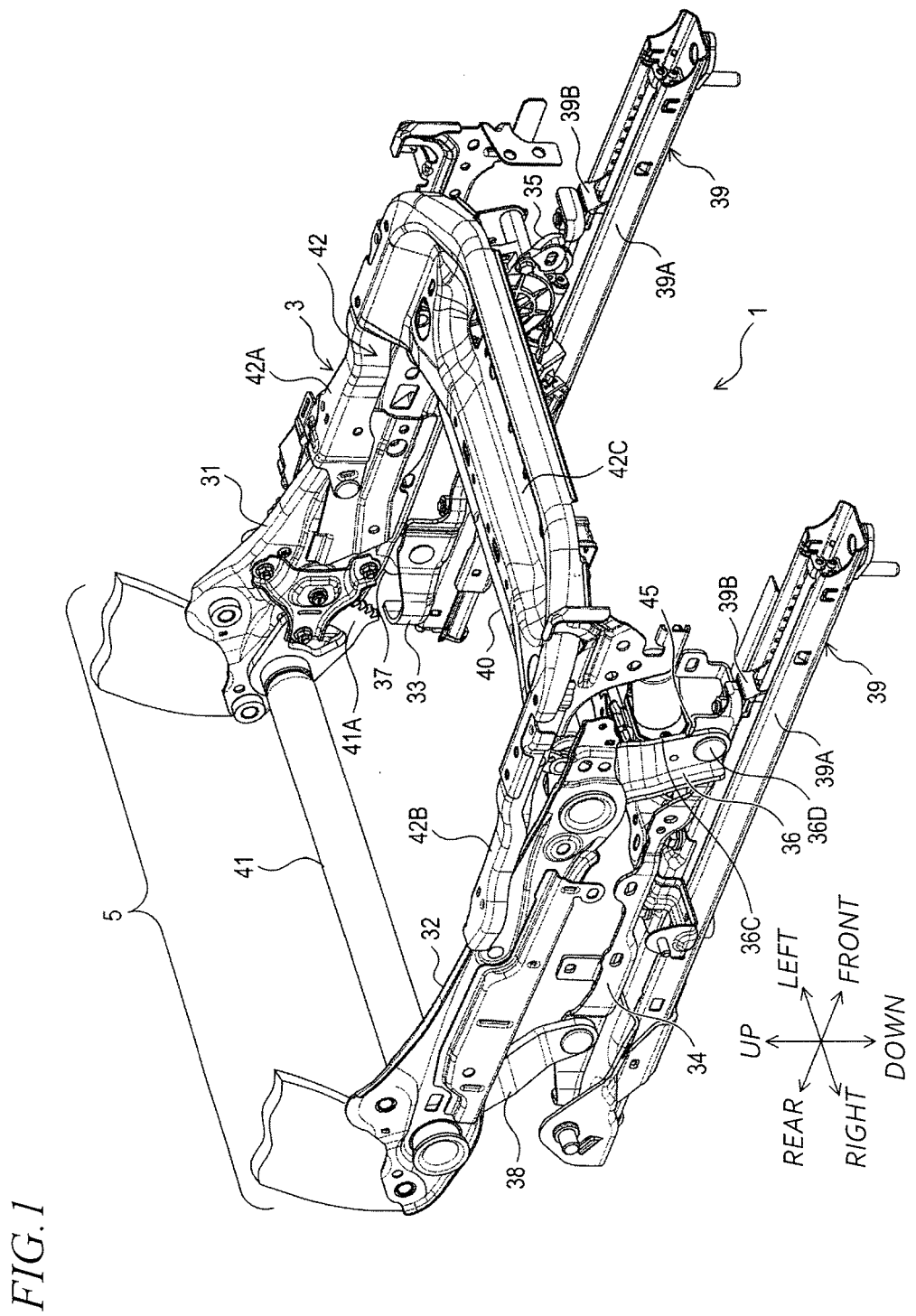
FIG. 1 is a perspective view illustrating a skeletal structure of a vehicle seat 1 according to an embodiment of the present disclosure.

"The embodiment of the present disclosure" to be described below is an example of the embodiment which belong to the technical scope of the present disclosure. In other words, the scope of the present disclosure as described in appended claims is not limited to a specific configuration, the structure, or the like described in the following embodiment.

Hereinafter, the embodiment of the present disclosure is described together with the drawings. Incidentally, arrows indicating directions illustrated in the drawings are described in order to comprehend the relation between the drawings easily. The present disclosure is not limited to the directions illustrated in the drawings.

At least a member or a portion denoted by the reference numeral is singly provided except a case where a notice such as "a plurality of" or "two of more" is given.

In the embodiment, a vehicle seat according to the embodiment is applied to a front seat of a standard passenger car. Incidentally, a direction in the following description means a direction in a state where the vehicle seat according to the embodiment is mounted on the vehicle.

As illustrated in FIG. 1, the skeletal structure of the vehicle seat 1 according to the embodiment is configured by a plurality of frames. The skeletal structure includes a cushion frame unit 3, a seat frame unit 5, and the like.

The cushion frame unit 3 is a skeletal structure configuring a seating part of an occupant. The seat frame unit 5 is a skeletal structure configuring a backrest part of the occupant. Further, the cushion frame unit 3 and the seat frame unit 5 are covered with a cushion pad (not illustrated) and a skin part (not illustrated).

The cushion pad is a member for absorbing an impact force. The cushion pad is a material for absorbing the impact force, for example, by the deformation of urethane foam. The skin part is a member covering the cushion pad. The skin part is made of leather, synthetic leather, or the like.

The cushion frame unit 3 includes seat frames 31 and 32, fixed brackets 33 and 34, forward link members 35 and 36, rearward link members 37 and 38, and the like.

The seat frames 31 and 32, the fixed brackets 33 and 34, the forward link members 35 and 36, and the rearward link members 37 and 38 are arranged on both sides of the vehicle seat 1 in a width direction (hereinafter, referred to as a seat width direction), respectively. The seat width direction is a horizontal direction which is substantially orthogonal to a front and rear direction (hereinafter, referred to as a seat front-and-rear direction) of the vehicle seat 1.

The seat frames 31 and 32 and the fixed brackets 33 and 34 are members extending in the seat front-and-rear direction. The seat frames 31 and 32 configure at least a portion of members which receive the load acting on the seating part.

The fixed brackets 33 and 34 are fixed in the indoor wall such as a vehicle floor panel through a sliding mechanism 39. The pair of sliding mechanisms 39 are a device for slidingly displacing the vehicle seat 1 in the seat front-and-rear direction.

The sliding mechanism 39 includes a fixed rail 39A, a movable rail 39B, and the like. The fixed rail 39A is fixed in the indoor wall. The movable rail 39B is slidable with respect to the fixed rail 39A, and is a member in which each of the fixed brackets 33 and 34 is fixed.

In the forward link members 35 and 36 and the rearward link members 37 and 38, one ends are connected with the seat frames 31 and 32, and the other ends are connected with the indoor wall through the fixed brackets 33 and 34.

In this embodiment, the seat frames 31 and 32 are arranged above the fixed brackets 33 and 34 in the vertical direction. Further, in the forward link members 35 and 36 and the rearward link members 37 and 38, upper ends are swingably connected with the seat frames 31 and 32, and lower ends are swingably connected with the fixed brackets 33 and 34.

Figure 2:
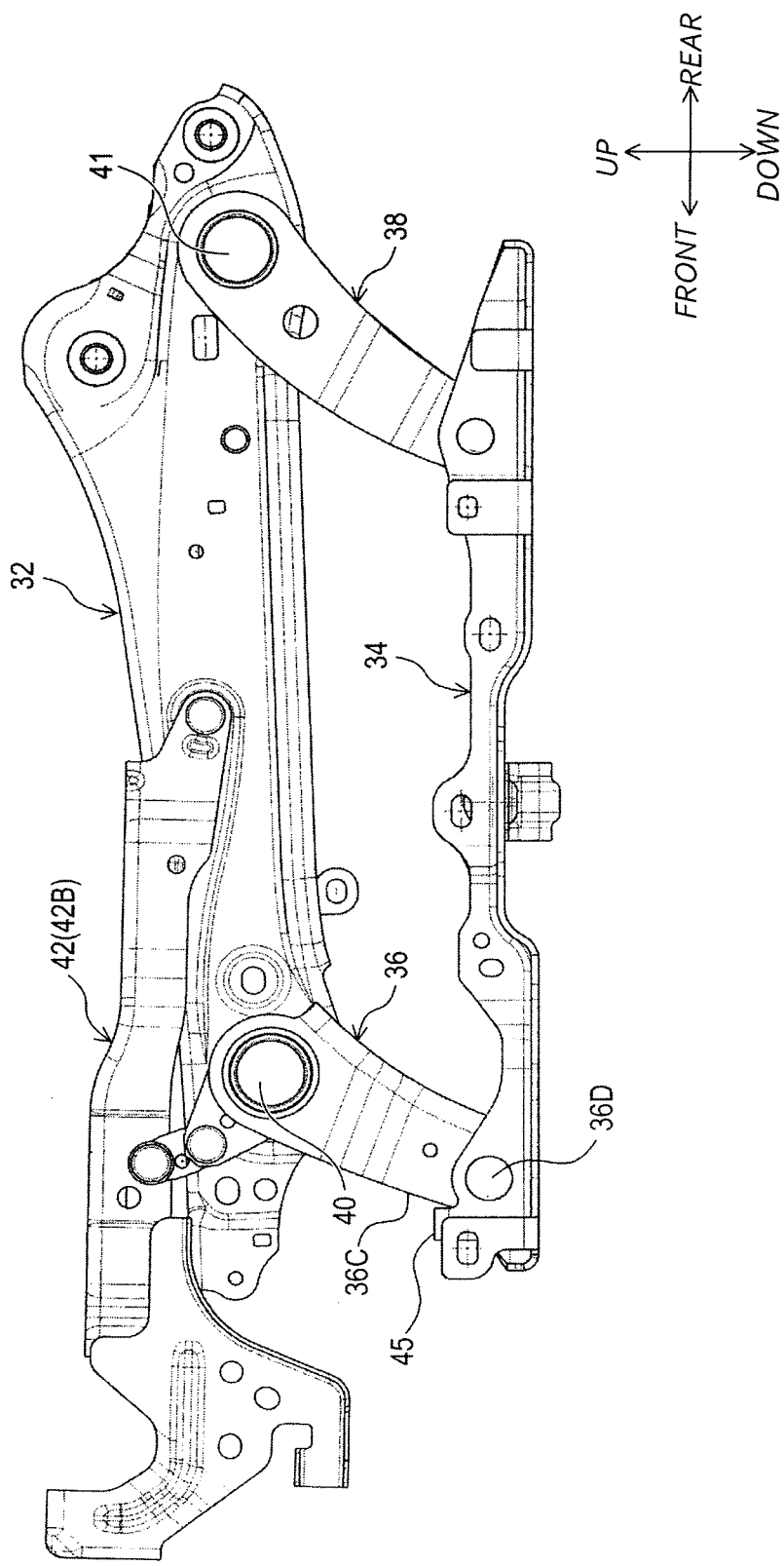
FIG. 2 is a view illustrating a connection structure of a seat frame, a forward link, and the like according to the embodiment of the present disclosure.

In other words, the forward link members 35 and 36 and the rearward link members 37 and 38, and the seat frames 31 and 32 and the fixed brackets 33 and 34 configure a four-node link mechanism such as a parallel link mechanism (see FIG. 2).

Therefore, when the forward link members 35 and 36 and the rearward link members 37 and 38 swing with respect to the fixed brackets 33 and 34, the seat frames 31 and 32 are displaced in the vertical direction.

Rods 40 and 41 extending in the seat width direction are provided in one ends and the other ends of the seat frames 31 and 32 in an extending direction. The rod 40 is arranged in the front ends of the seat frames 31 and 32 in the extending direction. The rod 41 is arranged in the rear ends of the seat frames 31 and 32 in the extending direction.

Figure 3:
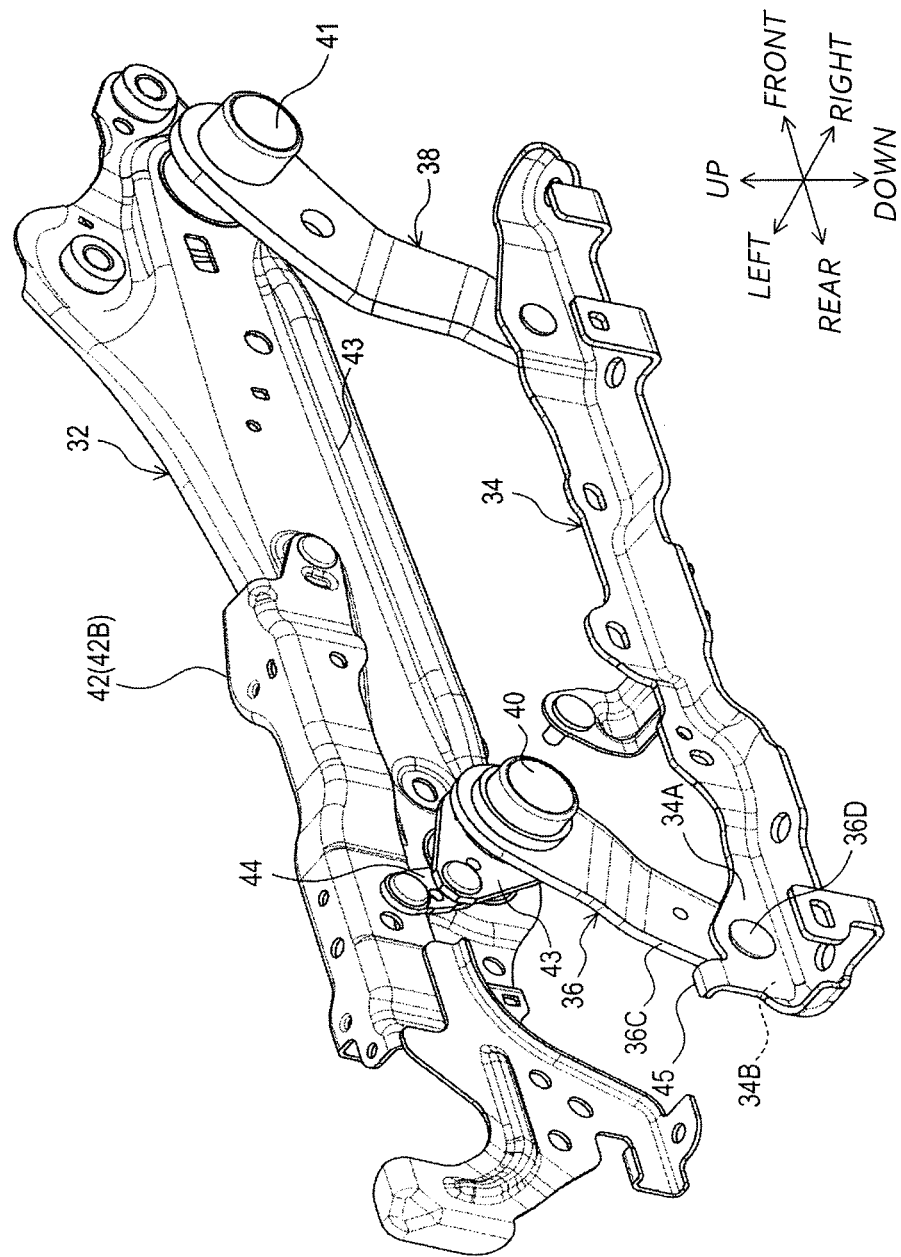
FIG. 3 is a view illustrating the connection structure of the seat frame, the forward link, and the like according to the embodiment of the present disclosure.

The rod 40 is arranged in a connection part between the seat frames 31 and 32 and the forward link members 35 and 36 (see FIG. 3). The rod 41 is arranged in a connection part between the seat frames 31 and 32 and the rearward link members 37 and 38 (see FIG. 3).

As illustrated in FIG. 1, a tilt frame 42 is provided in the front ends of the seat frames 31 and 32 in the extending direction. The tilt frame 42 is a member for changing the inclination angle of the front end of the seating part, and is swingably connected with the seat frames 31 and 32.

The tilt frame 42 according to this embodiment includes a pair of arms 42A and 42B, a connection frame 42C, and the like and is configured substantially in a C shape or a U shape. The arms 42A and 42B extend in a direction substantially parallel with the extending direction of the seat frames 31 and 32, and one ends thereof are swingably connected with the seat frames 31 and 32.

The connection frame 42C extends in the seat width direction and connects the other ends of the arms 42A and 42B in the extending direction. The tilt frame 42 swings in the vertical direction by using a rotational force input in the rod 40. As illustrated in FIG. 3, the rotational force is transmitted to the arm 42B, that is, the tilt frame 42 through the first link member 43 and the second link member 44.

The first link member 43 is fixed in the rod 40 by welding and the like. For this reason, the first link member 43 is rotated integrally with the rod 40. The one end (lower end in this embodiment) of the second link member 44 is swingably connected with the first link member 43.

The other end (upper end in this embodiment) of the second link member 44 is swingably connected with the arm 42B, that is, the tilt frame 42. A swinging-axis direction of the connection part between the first link member 43 and the second link member 44 and a swinging-axis direction of the connection part between the second link member 44 and the arm 42B are together substantially parallel with the seat width direction.

Incidentally, a structure of the seat frame 31 is the same as a structure of the seat frame 32 illustrated in FIGS. 2 and 3. In other words, the rotational force of the rod 40 is transmitted to the arm 42A through the first link member and the second link member provided on the seat frame 31.

As illustrated in FIG. 3, a regulation part 45 is provided in at least the fixed bracket 34. The regulation part 45 regulates that the forward link member 36 swings beyond a preset swinging range.

Figure 4:
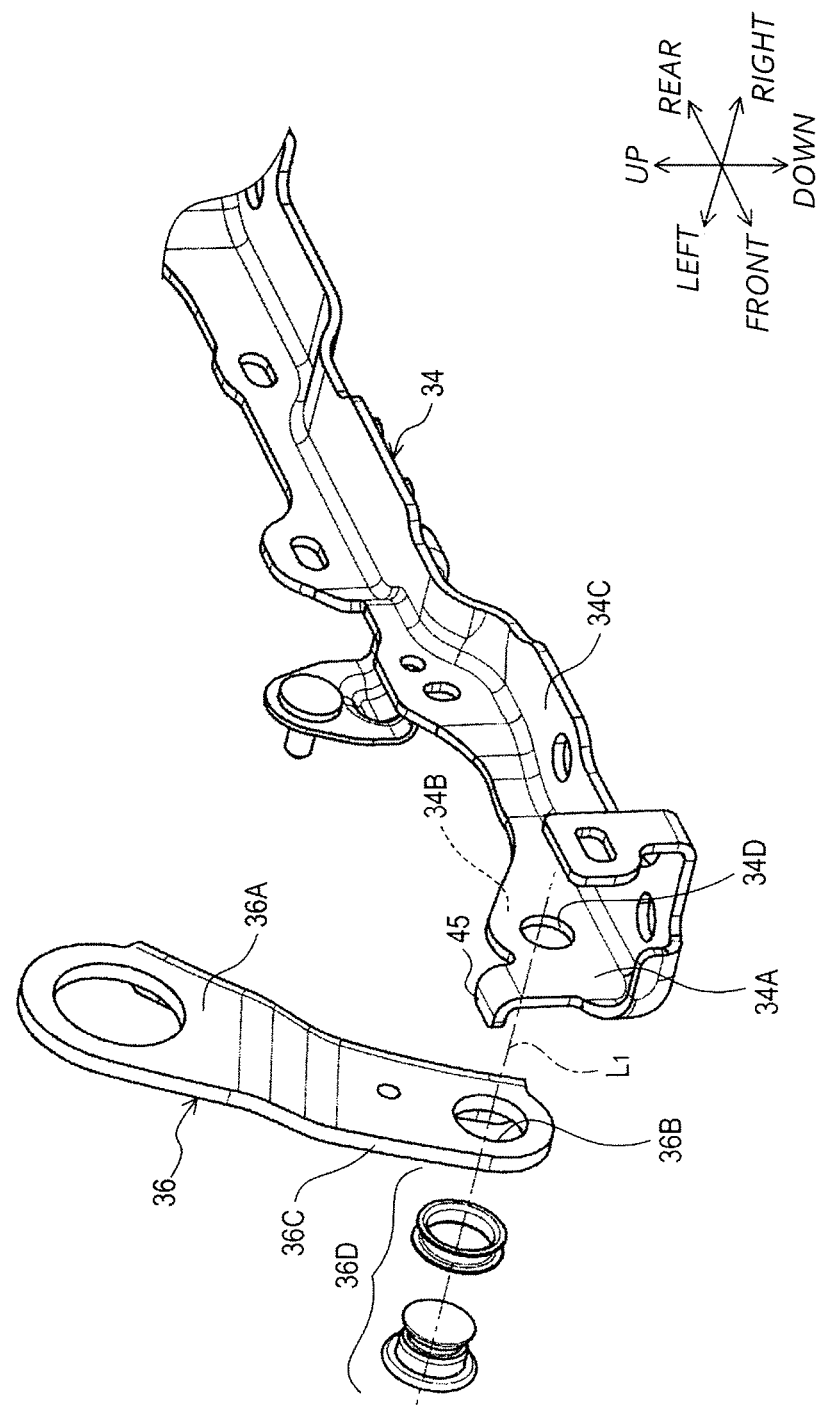
FIG. 4 is an exploded perspective view of a skeletal structure body illustrated in FIG. 3 according to the embodiment of the present disclosure.

That is, as illustrated in FIG. 4, the fixed bracket 34 includes a connection part 34A, a fixing part 34C, and the like. The connection part 34A includes a connection surface 34B (see FIG. 1) in which the forward link member 36 is connected.

The connection surface 34B configures a surface substantially orthogonal to the seat width direction, that is, a swinging axis L1 of the forward link member 36, and extends from the fixing part 34C in the substantially vertical direction. The fixing part 34C is fixed in the indoor wall (sliding mechanism 39 in the embodiment).

The fixing part 34C configures a surface substantially orthogonal to the connection surface 34B. For this reason, the fixed bracket 34 is configured such that a sectional shape orthogonal to the longitudinal direction thereof has a substantially L shape. Incidentally, the connection part 34A and the fixing part 34C are an integrally molded articles integrally formed by performing a press working on plate materials such as rolled steels.

The forward link member 36 is swingably connected in the connection part 34A with a direction substantially parallel with the seat width direction set as a swinging center axis L1. That is, the forward link member 36 has a surface 36A substantially orthogonal to the swinging center axis L1, and is configured as a planar body in which the thickness direction thereof is substantially parallel with the swinging center axis L1.

In other words, the forward link member 36 according to this embodiment is configured as a member in which the plate materials such as rolled steels are molded in a predetermined shape. Through holes 36B and 34D penetrating in the seat width direction are provided in one ends of the forward link member 36 and the connection part 34A.

The connecting member 36D which is swingably connected with the forward link member 36 and the fixed bracket 34 (connection part 34A) is inserted and mounted in the through holes 36B and 34D. Further, the forward link member 36 swings in the front and rear direction of the vehicle seat 1.

As illustrated in FIG. 4, the regulation part 45 is an extending part which extends from the connection part 34A in a direction substantially parallel with the swinging center axis L1. Specifically, the regulation part 45 extends to the same side as the forward link member 36 from the connection surface 34B in the upper end of the connection part 34A. Incidentally, in this embodiment, the regulation part 45 and the connection part 34A are an integrally molded article integrally formed by a plastic working such as the press working.

By facing and contacting (hereinafter, referred to as "abut") the forward link member 36 in the seat front-and-rear direction, the regulation part 45 regulates that the forward link member 36 swings beyond the swinging range. Incidentally, in this embodiment, when the forward link member 36 swings toward the front side of the seat, the regulation part 45 and the forward link member 36 abut on each other.

A portion (hereinafter, referred to as an abutting part), which abuts on the regulation part 45, of the forward link member 36 is configured by an end face 36C forming the thickness of the plate material which is a planar body. That is, in this embodiment, the abutting part is configured by using a sectional surface when the outer shape of the forward link member 36 is formed by performing a cutting working (shear working) or the press working on the plate material.

In the embodiment, when the regulation part 45 and the forward link member 36 abut on each other, it is regulated that the forward link member 36 swings beyond the preset swinging range.

Accordingly, it can be suppressed that an excessively large load acts on another member displaced in mechanical conjunction with the forward link member 36. Incidentally, the "another member" is a sector gear 41A (see FIG. 1) provided in the rod 41, for example.

"The preset swinging range" is a swinging range in which it can be suppressed that the excessively large load acts on the another member displaced in mechanical conjunction with the forward link member 36. Therefore, a specific value in the swinging range is varied depending on a specification determined in each of the vehicle seats.

In the embodiment, since the regulation part 45 is provided in the fixed bracket 34, the shape of the forward link member 35 is a simple shape compared to, for example, a case where the regulation part 45 is provided in the forward link member 35.

Therefore, an assembling operability of assembling the forward link member 35 in the fixed bracket 34 and the seat frame 32 is excellent compared to the case of assembling the forward link member 35 provided with the regulation part 45.

In the above-described embodiment, the regulation part 45 is provided in the fixed bracket 34. However, the present disclosure is not limited thereto. That is, for example, the regulation part 45 which regulates the swinging of the forward link member 35 may be provided in the fixed bracket 34, or the regulation part 45 which regulates the swinging of the rearward link members 37 and 38 may be provided in the fixed brackets 33 and 34.

The regulation part 45 according to the above-described embodiment is formed such that the upper end of the connection part 34A is bent toward the forward link member 36. However, the present disclosure is not limited thereto.

That is, the regulation part 45 may be formed, for example, such that a portion of the connection part 34A is cut and raised. In addition, the regulation part 45 may be provided in a portion except the upper end of the connection part 34A. As the abutting part according to the above-described embodiment, the sectional surface is used as it is. However, the present disclosure is not limited thereto.

The fixed bracket 34 according to the above-described embodiment has an L-shaped section. However, the present disclosure is not limited thereto. That is, the fixed bracket 34 may have a T-shaped section, for example.

The vehicle seat according to the above-described embodiment is intended for the automobile such as a passenger vehicle. However, the present disclosure is not limited thereto. That is, the present disclosure can be applied to a seat for a mobile body such as a railroad vehicle, a ship, and an airplane.

In the above-described embodiment, the indoor wall is exemplified by the vehicle floor panel. However, the present disclosure is not limited thereto. That is, the indoor wall includes an interior constituent member, which configures an interior of a mobile body, such as a floor panel, a wall panel, a floor frame, and a wall frame.

The present disclosure can be carried out in various ways within the scope of the claims, and is not limited to the above-described embodiments.

According to the present disclosure, there is provided a vehicle seat which is fixed in an indoor wall of a vehicle, including: a seat frame (32) which is at least a portion of a skeletal structure of the seat; a fixed bracket (34) that is fixed on the indoor wall, the fixed bracket including a connection part (34A) having a connection surface (34B) that is substantially orthogonal to a seat width direction and extending in a substantially vertical direction; a link member (36) in which one end is swingably connected with the connection part (34A) and the other end is connected with the seat frame (32), the link member (36) being swingable in a direction substantially parallel with the seat width direction set as a swinging center axis (L1); and a regulation part (45) which extends from the connection part (34A) in a direction substantially parallel with the swinging center axis (L1), the regulation part (45) being configured to regulate, by abutting on the link member (36) in the seat front-and-rear direction, that the link member (36) swings beyond a preset swinging range.

According to this configuration, it is regulated that the link member (36) swings beyond the preset swinging range. Therefore, it can be suppressed that an excessively large load acts on another member displaced in mechanical conjunction with the link member (36).

In the present disclosure, "the preset swinging range" is a swinging range in which it can be suppressed that the excessively large load acts on the another member displaced in mechanical conjunction with the link member (36). Therefore, a specific value in the swinging range is varied depending on a specification determined in each of the vehicle seats.

The link member (36) preferably has a portion which is configured by an end face (36C) forming a thickness of the planar body and abuts on the regulation part (45). Further, the regulation part (45) desirably extends to the same side as the link member (36) from the connection surface (34B) in the upper end of the connection part (34A).

Incidentally, reference numerals within the parentheses are examples showing correspondence relation with a specific configuration according to the embodiment (to be described later). The present disclosure is not limited to the specific configuration indicated by the reference numeral within the parentheses.

What is claimed is:

1. A vehicle seat for a vehicle, the vehicle seat comprising:
  a seat frame that serves as at least a portion of a skeletal structure of the seat;
  a fixed bracket that is configured to be fixed on an indoor wall of the vehicle, the fixed bracket including a connection part having a connection surface that is substantially orthogonal to a seat width direction and extending in a substantially vertical direction;
  a link member in which a first end of the link member is swingably connected with the connection part and a second end of the link member is connected with the seat frame, the link member being swingable in a direction substantially parallel to the connection surface and about a swinging center axis that is oriented parallel to the seat width direction; and
  a regulation part that includes a first part which extends upward in the substantially vertical direction from the connection part and a second part which extends from the first part in a direction substantially parallel with the swinging center axis, the second part having an edge portion being configured to regulate, by abutting on the link member in a seat front-and-rear direction, that the link member swings beyond a preset swinging range.

2. The vehicle seat according to claim 1, wherein the link member has a surface substantially orthogonal to the seat width direction, the surface of the link member being defined by a planar body in which a thickness direction of the planar body is substantially parallel with the seat width direction, and wherein the link member has a portion including an end face forming a thickness of the planar body that abuts on the second part of the regulation part.

3. The vehicle seat according to claim 1, wherein the second part of the regulation part extends to a same side as the link member with respect to the connection surface, the connection surface being provided at an upper end of the connection part.

4. The vehicle seat according to claim 1, wherein the regulation part is provided at a front end portion of the fixed bracket.

* * * * *